Feb. 4, 1941.    J. W. FLANNERY    2,230,322
PROCESS AND APPARATUS FOR PRODUCING METALS
Filed Oct. 11, 1937    4 Sheets-Sheet 1
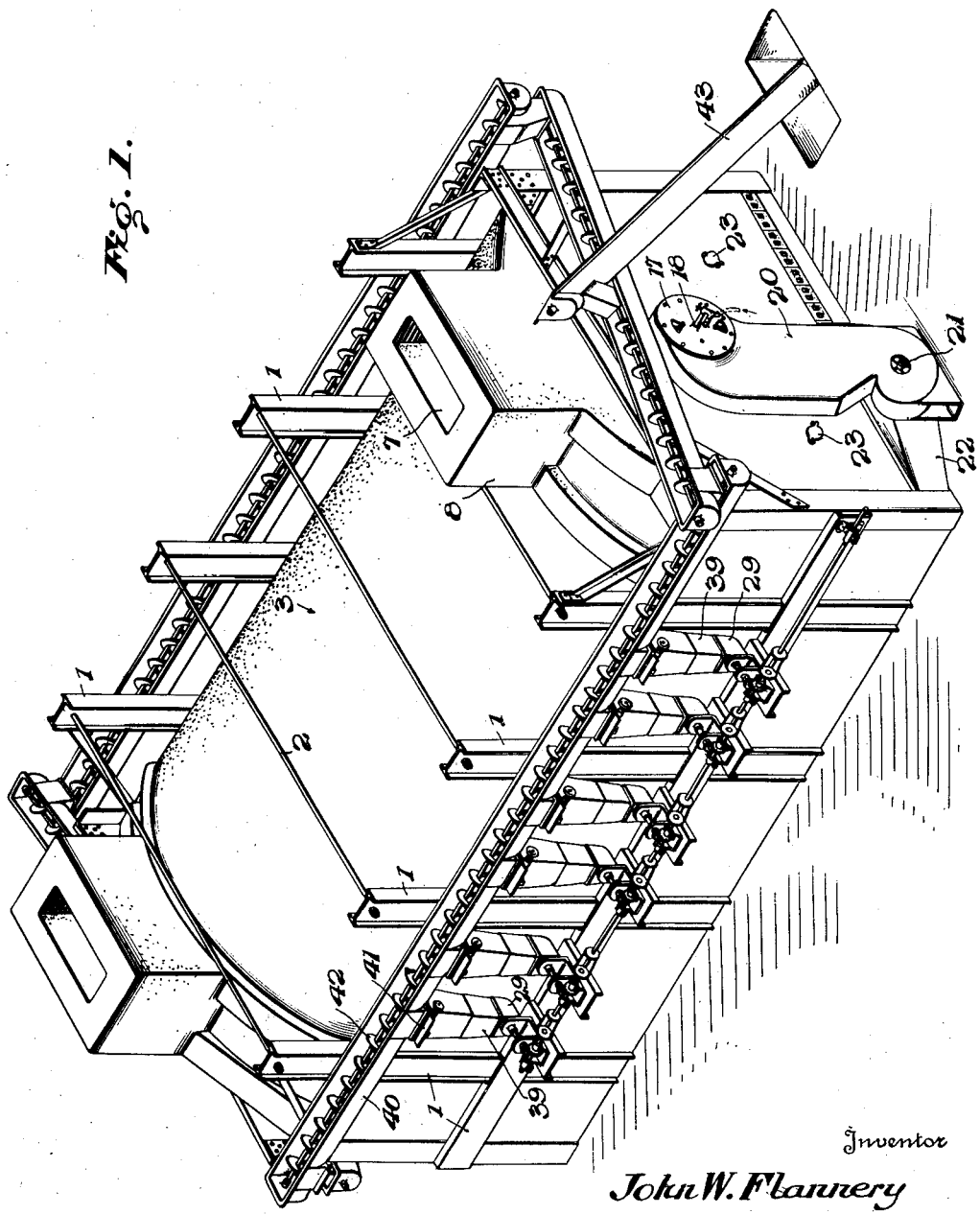
Inventor
John W. Flannery
By Cameron, Kerkam + Sutton
Attorneys Feb. 4, 1941. J. W. FLANNERY 2,230,322
PROCESS AND APPARATUS FOR PRODUCING METALS
Filed Oct. 11, 1937 4 Sheets-Sheet 2
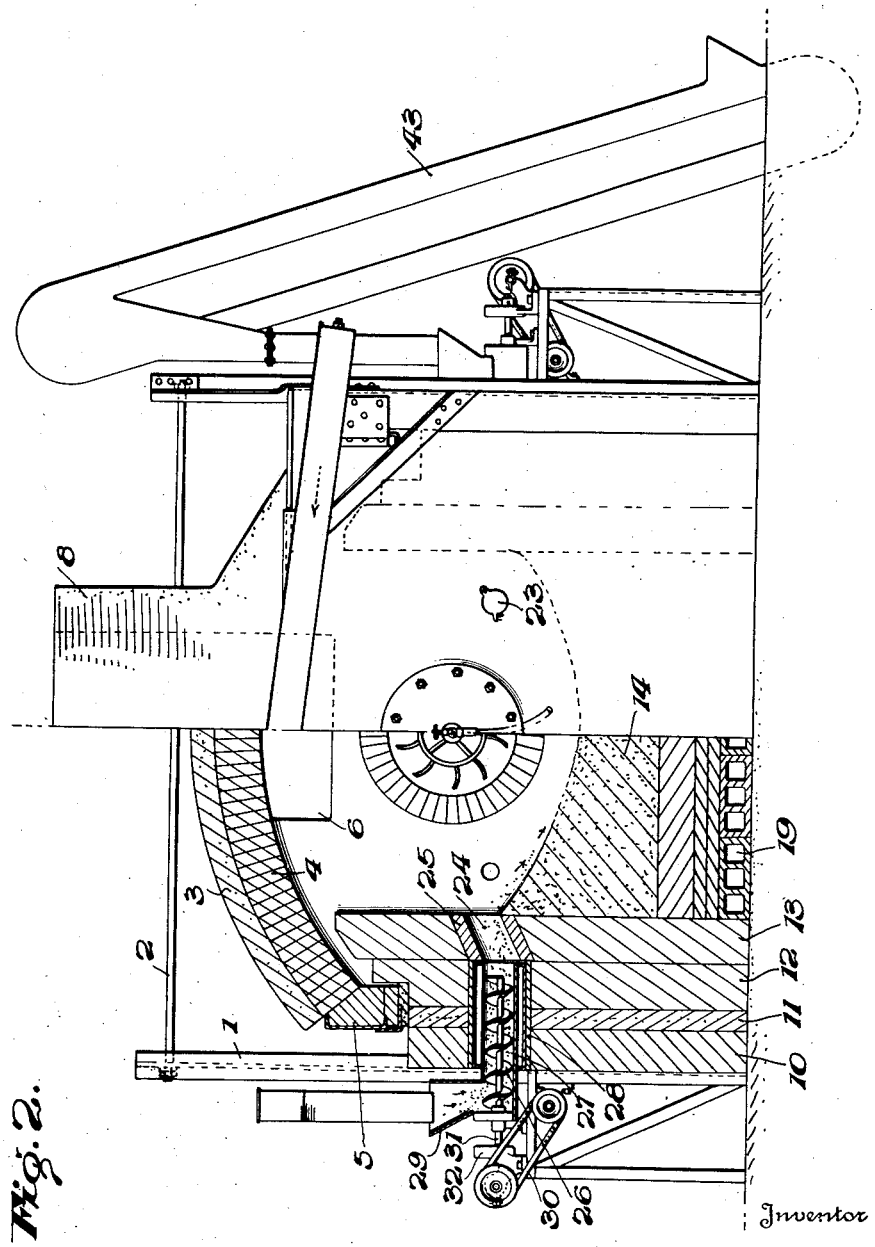
Inventor
John W. Flannery
By Cameron, Kerkam & Sutton
Attorneys Feb. 4, 1941. J. W. FLANNERY 2,230,322
PROCESS AND APPARATUS FOR PRODUCING METALS
Filed Oct. 11, 1937 4 Sheets-Sheet 3
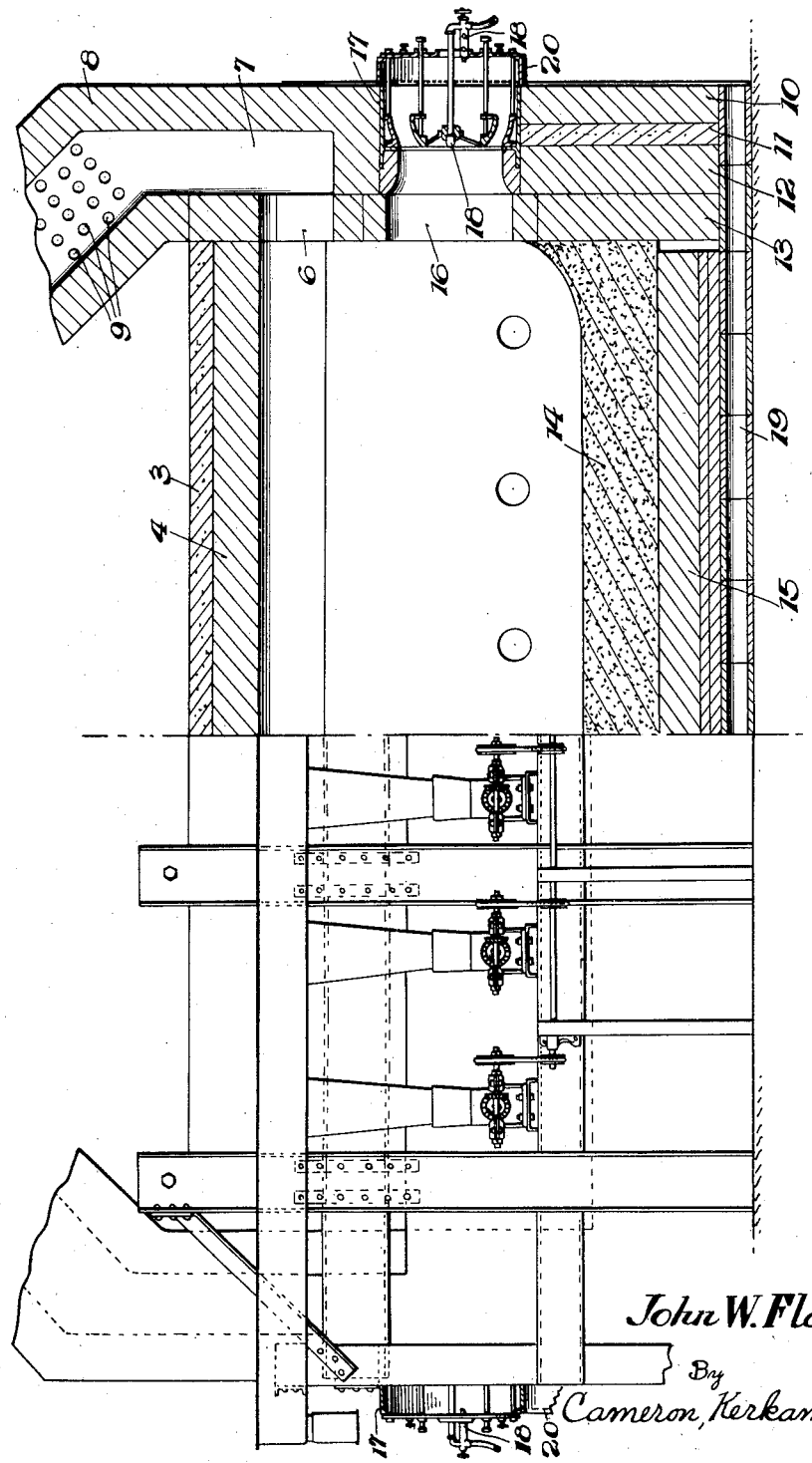
Inventor
John W. Flannery
By Cameron, Kerkam + Sutton
Attorneys

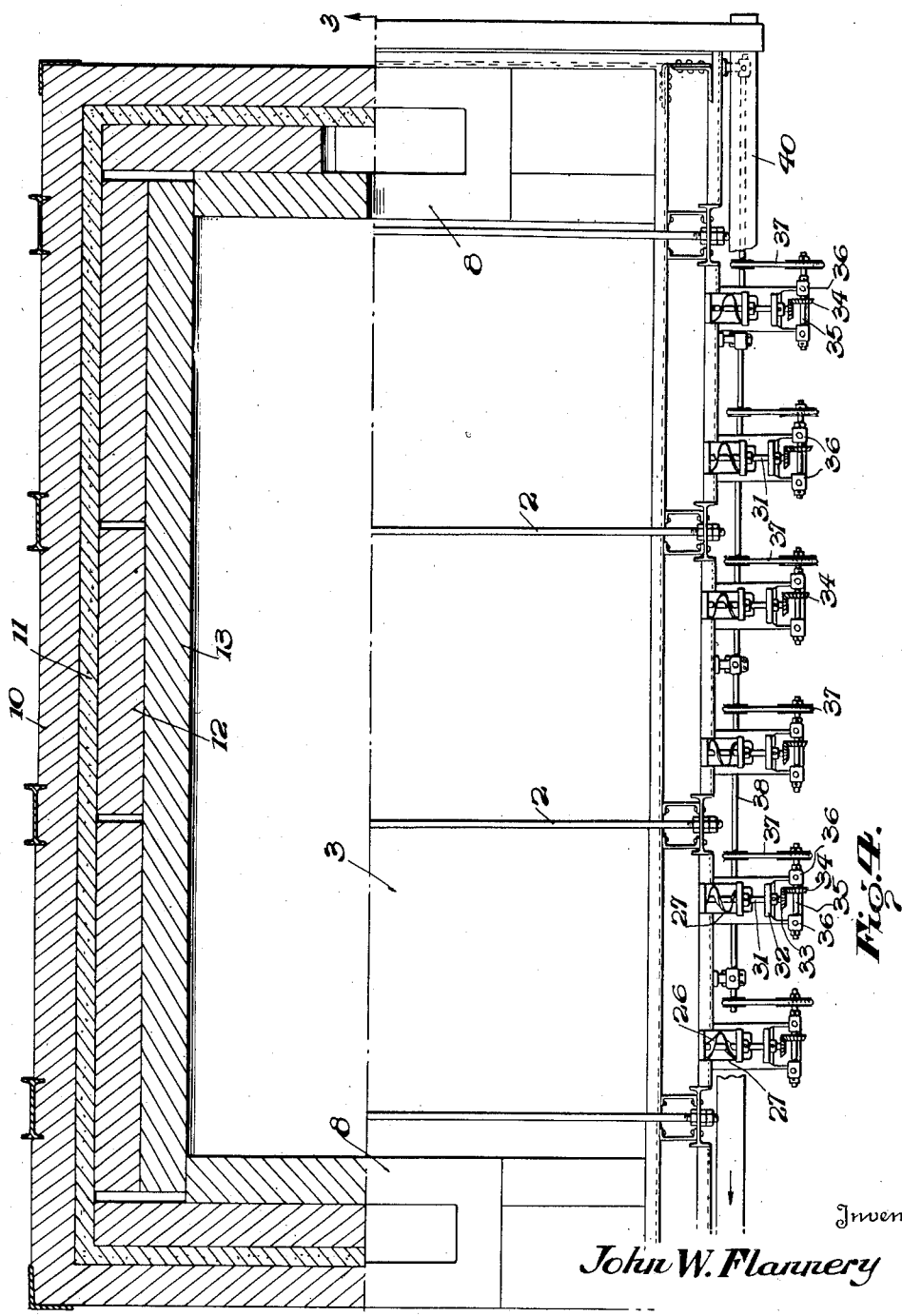

Patented Feb. 4, 1941

2,230,322

UNITED STATES PATENT OFFICE 2,230,322

PROCESS AND APPARATUS FOR PRODUCING METALS

John W. Flannery, Portland, Oreg., assignor to M. F. C. Company, Portland, Oreg., a corporation of Oregon Application October 11, 1937, Serial No. 168,457

11 Claims. (Cl. 75—89)

This invention relates to a process and apparatus for producing metals from their ores.

It has been proposed heretofore to feed comminuted mixtures of ore and reducing material to furnaces of the reverberatory or open hearth or similar type to reduce the ore and melt the metal. As far as I am aware, however, such operations heretofore have not proved satisfactory for various reasons, chief among which have been the difficulties of obtaining complete reduction and of controlling the quality of the bath metal except under special conditions and at great cost. Consequently, these prior proposed procedures have not come into use in competition with conventional procedures such as blast furnace operation but have either been abandoned as impractical or have been used only in special instances.

It is an object of the present invention to provide a novel process and apparatus for reducing ores directly to metal in a single operation that is both practical and economical.

Another object of the invention is to make practicable the continuous operation of such a process in a furnace of the reverberatory or open hearth or similar type to enable the production of metal at a low cost.

A further object is to provide not only for the reduction of the ore and melting of the metal as stated above, but also for refining the metal in the same operation as may be desired to meet the requirements of the finished product.

Another object is to provide continuous feeding of a charge comprising ore and reducing materials under conditions such that the advancing charge is progressively subjected to the furnace temperature while its speed of movement is regulated to effect substantial reduction before the charge enters the interior of the furnace proper where the reduced metal is melted.

A still further object is to provide a plurality of such continuous feeds so that the total charge enters the interior of the furnace in the form of a plurality of relatively small streams of reduced metal and slag forming materials, each under the control of the operator to enable nice and accurate adjustment of conditions for satisfactory operation.

Other objects of the invention will appear hereinafter as the description proceeds.

For purposes of exemplification, the invention will first be described in detail in connection with iron oxide ore ($Fe_2O_3$), although it will be understood as explained hereinafter that the invention is also applicable to other ores. A typical iron oxide ore of the type referred to may comprise approximately 15% non-metallic substances, chiefly silica, 60% metallic iron and 25% oxygen. In carrying out the invention with this ore, the charge to be treated as hereinafter described must include a suitable reducing agent to combine with the oxygen of the ore together with suitable slag forming materials to combine with the gangue to form a liquid slag of the desired composition. The amount of reducing agent required to chemically reduce the ore can be calculated from the analysis of the ore, and the amount of reducing agent to be added to the charge can be determined accordingly, depending on whether or not excess or insufficient reducing agent is desired. The reducing agent employed is preferably carbon because of its availability and low cost, although any other suitable reducing agent may be employed instead, and in the case of the iron oxide ore referred to, approximately 19% of carbon is required for chemical reduction. The slag to be formed in the furnace as hereinafter described may be desired to be basic, acid or neutral and the nature and amount of slag forming materials to be added to the charge can be predetermined accordingly and also with respect to the removal of impurities from the metal, the melting point of the slag, etc. As an example, a typical charge may comprise 2,000 pounds of ore, 450 pounds of calcium carbonate and about 400 pounds carbon. It will be understood, however, that the composition of the charge will vary depending on the nature of the ore and the analysis of metal that it is desired to obtain.

In carrying out the process, such a charge is fed to a furnace of the reverberatory or open hearth or similar type under conditions which effect substantial reduction of the charge before entering the interior of the furnace proper. The constituents of the charge are first crushed or otherwise suitably comminuted and intimately mixed to facilitate the desired reactions between the reducing agent and the ore, and this charge mixture is heated to a reducing temperature while confined in a body for a sufficient time to permit the chemical reactions of reduction to take place. In order to obtain these conditions the charge is preferably fed through a feed tube or tubes formed in the refractory wall of the furnace in such a manner that the charge advancing through the tube is progressively raised to the temperature of the furnace before entering the interior of the furnace proper, the body of the charge filling the tube and being confined therein under reducing conditions. In some cases it will be desirable to use a charge constituted as described in my prior Patent No. 1,983,604, but it will be understood that the process of this patent is not necessary to the present invention. The body of comminuted and intimately mixed charge is continuously forced through the tube by suitable mechanical means which can be regulated by the operator to control the speed of movement of the charge in proportion to the length of the tube to provide the necessary length of time for reduction to take place. At the same time the body of the charge substantially seals the tube and substantially prevents the entry of air which might cause combustion of the reducing agent and interfere with the complete reduction of the ore, except in special instances such as mentioned hereinafter when small amounts of air are desirably introduced.

Preferably the total charge is fed to the furnace through a plurality of such tubes, each of which is provided with a feeding means and the feeding means being controllable by the operator. Hence the operator can observe the charge as it enters the furnace from each tube and can control the speed of movement of the charge through the tubes to insure substantially complete reduction before the charge enters the furnace proper. This enables delicate control of the operation which could not be obtained with a single large feed, and prevents the accumulation of piles or heaps of unmelted material in the furnace which would slow up operation and interfere with the maintenance of uniform heat conditions in the furnace. It also enables the operator to prevent quantities of unreduced or partially reduced ore from entering the furnace, whereby the quality of the bath metal may be accurately controlled without subsequent and supplementary treatment, while at the same time it insures substantially complete reduction and maximum recovery.

The furnace is maintained at a suitable temperature above the melting point of the metal, say 3,000° F. or above for a charge of the character described, and the temperature in the feeding tubes preferably varies from approximately 1,500° F. at the feeding end up to the furnace temperature at the discharge end, the maintenance of these temperatures being aided by the heat resulting from such burning of the constituents of the charge as takes place. The furnace is preferably fired by one or more burners using oil, powdered coal or other suitable fuel, and the supply of air to the burners is controlled by the operator to obtain substantially perfect combustion so that the furnace atmosphere is neutral or reducing due to the gases resulting from the reactions of reduction. To maintain this condition the furnace is substantially sealed other than at the feeding tubes which are filled with the comminuted charge and the furnace is operated with little or no draft.

A suitable furnace for carrying out this process is illustrated in the accompanying drawings, but it is to be expressly understood that said drawings are for purposes of illustration only and are not to be taken as defining the limits of the process or of apparatus to be used in carrying out the process, reference being had to the appended claims for this purpose.

In the drawings,

Fig. 1 is a perspective view of the furnace;
Fig. 2 is an end view of the furnace, partly in section;
Fig. 3 is a side view of the furnace partly in section; and
Fig. 4 is a plan view of the furnace partly in section.

The furnace, which may be of any suitable size and shape, is preferably constructed from suitable refractory materials and is supported by a metal framework which, as shown in Fig. 1, comprises both vertical and horizontal members 1, the upper ends of the vertical members 1 being connected by tie rods 2. The roof 3 of the furnace as shown in Fig. 2 comprises an arch 4 of carborundum brick or similar refractory material, the arch extending from side to side of the furnace and being supported at its edges on the horizontal supports 5 at the top of the side walls. Suitable vents are provided for the escape of gases from the furnace, such as the vents 6 (Figs. 2 and 3) formed at the ends of the furnace and communicating with passages 7 in the stacks 8 extending above the roof of the furnace. The furnace is preferably designed to avoid draft as much as possible so as to exclude air from the feeding tubes and maintain a reducing atmosphere in the furnace. To this end it may be desired to cool the gases escaping through the stacks and the passages 7 may comprise suitable cooling means such as the pipes 9 (Fig. 3).

The side wall construction of the furnace is shown more particularly in Fig. 2. The external wall 10 may comprise, for example, a suitable red brick facing and a wall or layer 11 of suitable insulating brick. Within these walls is a wall 12 comprising a fire brick backing and the furnace is lined by a wall 13 of suitable material such as silica brick. Substantially the same arrangement may be employed at the ends of the furnace as shown in Fig. 3, wherein the same numerals are employed to designate the end walls corresponding to the side walls 10, 11, 12 and 13. The ganister bottom 14 is supported on a suitable layer 15 of fire brick or other similar material.

The furnace is preferably fired by burners which are preferably located at the ends of the furnace in order to obtain good heat distribution. In the form shown, one burner is located at each end of the furnace and is designed to act also as a door which may be opened or removed in case outside additions are to be made to the charge and also to permit the patching of the furnace bottom after each heat. As seen in Figs. 2 and 3, each end of the furnace is accordingly provided with an opening 16 which is closed by a suitable door structure 17 carrying a burner 18 of any suitable type. To effect a saving of fuel and to assist in maintaining the desired high temperature in the furnace, the air supply to the burners 18 may be preheated and this is preferably accomplished by laying hollow tile pipes 19 lengthwise under the furnace. As shown in Fig. 1, the air supply to the burner 18 at one end of the furnace is delivered to the burner through a pipe 20 by a suitable blower 21 having a suction hood 22 covering the ends of half of the pipes 19 whereby the air to the burner is drawn through the pipes under the entire length of the furnace. The other half of the pipes 19 is used to preheat the air for the burner 18 at the other end of the furnace. The end walls may also comprise peep holes covered by the cover plates 23 as shown in Fig. 1 whereby the operator may observe the interior of the furnace.

When the interior of the furnace is maintained at a high temperature, for example 3,000° F., the heat is absorbed by the refractories and the temperature diminishes through the refractory wall toward the outside of the furnace. Hence the length of the passages employed for reduction of the ore as above described is dependent on the temperature gradient in the refractory walls and can be determined from the temperatures of the refractories for any desired range of temperatures. As shown herein, the furnace lining 13, which can be of any suitable thickness, provides the length necessary to obtain the desired temperature range. The lining 13 is accordingly provided with a plurality of openings or passages 24 which as shown are circular in cross section and are disposed along both sides of the furnace at spaced intervals, the discharge ends of these passages terminating immediately above the edges of the inclined furnace bottom 14 as shown in Fig. 2. These passages 24 may be provided with liners 25 of any suitable material, and as shown in Fig. 2, they preferably incline slightly upwardly in order to prevent the hot comminuted charge from escaping too readily into the interior of the furnace before reduction is completed.

Any suitable mechanical means may be employed for feeding the charge to the passages 24 and in the form shown spiral or screw conveyors 26 are employed for this purpose, these conveyors operating in tubes 27 extending through the furnace walls 10, 11 and 12 in alignment with the outer ends of the passages 24 and being preferably provided with cooling jackets 28 for the circulation of a suitable cooling medium such as water. The charge materials in the hoppers 29 are thus forced continuously through the tubes 27 and into the reduction passages or chambers 24.

Any suitable means may be employed for driving conveyors 26 and for enabling the control and regulation of their speed of rotation in order to control the rate of feed of the charge through the reduction passages 24. While in some cases it may be desirable to provide for separate and independent regulation of the speed of each conveyor, depending upon the nature of the operation to be carried out by the furnace, it will usually be sufficient—when the same charge is employed throughout to provide a common drive for all of the conveyors 26 and to regulate their speed through control of the operation of the driving motor. The drawings show the furnace equipped for an operation of the latter type. The outer ends of the feed tubes 27 are supported on tables 30 forming a part of the framework of the machine. The conveyor shafts 31 (which may be hollow as described hereinafter) are mounted for rotation in bearings 32 carried on the table 30 and are provided with bevel gears 33 driven by bevel gears 34 mounted on drive shafts 35 which rotate in the bearings 36. The shafts 35 may be driven from any suitable common source of power and as shown are connected by belts 37 with a common drive shaft 38.

It may also be desired to provide for a continuous and automatic feed of the charge to the hoppers 29 and Fig. 1 shows suitable apparatus for this purpose. Feeding chutes 39 are disposed above each of the hoppers 29, the upper ends of the feed chutes being in communication with a feed trough 40 through suitable valves 41. Preferably, the trough 40 extends entirely around the furnace as shown in Fig. 1 and is provided with a suitable screw conveyor 42 to cause continuous circulation of the charge around the furnace so that a continuous supply of the charge drops into each chute 39. Thus it is only necessary to prepare the charge mixture and to deliver it in any suitable manner, as by means of the elevator 43, to the trough 40 in quantity sufficient to insure the continuous circulation of an adequate supply.

When a charge of the character described above is fed to the furnace by means of the elevator 43 and circulates through the trough 40, each of the feed hoppers 29 is continuously filled with the charge. From each feed hopper the charge is forced by the conveyors 26 through the feed tubes 27 and into the reducing passages or chambers 24. In these passages the charge is confined under reducing conditions as above described, the temperature range from the inlet to the outlet of the reducing passage and the time necessary for the charge to complete its travel through the passage being sufficient to effect substantial reduction of the ore before it enters the furnace proper. At the discharge end of the passages 24, the reduced ore and the other materials in the charge are subjected to melting temperatures so that the materials melt and form small streams which trickle down the bottom of the furnace and collect in a pool or bath. By observing the operation of each of the tubes, the operator can determine whether or not the desired reduction is taking place therein and can control the speed of the screw conveyors 26 to provide either greater or less time in the reducing passages, as may be necessary. As the melted metal accumulates on the hearth in suitable quantity, it can be tapped off in the usual manner without interfering with the continuous operation.

The invention thus utilizes the absorbed heat of the furnace walls, otherwise wasted, and the heat evolved during such burning of the constituents of the charge as takes place to maintain the desired temperatures in the reduction zones. Further the loss of $CO_2$ from the calcium carbonate, of oxygen from the ore and of carbon reduces substantially the amount of material charged into the furnace proper and consequently increases the output of the furnace. Since drafts are prevented and air excluded as far as possible, the atmosphere in the furnace comprises principally the gases evolved during reduction of the ore, $CO_2$ from the calcium carbonate and the gases of combustion from the burners which are regulated to obtain perfect combustion as nearly as possible. Hence the atmosphere in the furnace is normally reducing.

The foregoing description applies particularly to the treatment of iron oxide ores under conditions such as to effect chemical reduction of the ore without substantial absorption of carbon by the metal. In case it is desired to produce a high carbon metal, an excess of carbon is added to the charge and preferably a suitable quantity of air under light pressure is supplied to the feeding tube through the hollow shaft 31, thus increasing the heat of the charge in the reducing chamber and permitting the metallic portion of the charge to absorb carbon.

When treating sulphide ores, a reducing agent such as carbon is not necessary in the charge. In this case only fluxing materials need be added, the ore being reduced by forcing a predetermined amount of air through the hollow shaft 31 to combine with the sulphur and the gas formed being recovered and treated in the usual manner. In this way almost all of the sulphur is removed, the iron and slag forming materials melting and forming a metal bath covered by liquid slag in the bottom of the furnace as described above. In this case, the slag forming materials are preferably selected to provide a strongly basic slag in order to remove as much sulphur as possible from the iron.

The same process and apparatus may be applied to ores other than iron ores such as chrome and manganese ores. In these cases the amount of reducing agent to be added depends on the analysis of the particular ore to be treated, sufficient carbon being used in the charge to allow reduction and the proper amount of flux being added to make the desired slag. It will further be understood that different ores may be treated simultaneously in different feed tubes to provide alloys of the desired composition. In such cases of multiple reduction of different ores in the same furnace, the rate of feed of each of the constituents can be individually controlled not only to regulate the composition of the product but also to provide the proper conditions of reduction for the different ores.

While certain embodiments of the invention have been particularly described above, both as to the process and apparatus, it will be understood that the invention is not restricted to these particular embodiments which have been described by way of example and that changes may be made in the details of the process and of the apparatus without departing from the spirit of the invention. Reference is therefore to be had to the appended claims for a definition of the limits of the invention.

What is claimed is:

1. The process which comprises forming separate charges each comprising a comminuted mixture of a different ore together with slag forming materials and sufficient reducing agent to reduce the ore, continuously and separately feeding said charges to a furnace maintained at a temperature above the melting point of the metals through a plurality of feed passages in each of which a portion of one of said charges is confined while its temperature progressively increases at least to that necessary for reduction as it advances into the furnace, regulating the rate of movement of the charge in each of said passages in proportion to the length thereof to effect substantial reduction of the ore therein before entering the furnace, and forming a bath of said different metals covered by liquid slag by the melting of the charge leaving each of said passages and the collection of the melted streams on the furnace hearth.

2. The process which comprises forming a comminuted mixture of ore together with slag forming materials and carbonaceous materials in excess of the amount of carbon required for chemical reduction of the ore, continuously feeding said charge to a furnace maintained at a temperature above the melting point of the metal through a plurality of heated feed passages in each of which a portion of the charge is confined while blowing air into each feed passage to increase the temperature of the heated feed passages to a point above that of reduction, and at which the metallic portion of the charge absorbs carbon, and regulating the speed of movement of the charge in each passage in proportion to the length thereof to effect substantial reduction of the charge before entering the furnace, the charge melting as it leaves each passage and the melted streams collecting on the furnace hearth to form a bath of melted metal covered by liquid slag.

3. The process which comprises forming a comminuted mixture of ore together with slag forming materials and a quantity of reducing agent sufficient to reduce the ore, continuously feeding said charge to a furnace maintained at a temperature above the melting point of the metal through a plurality of feed passages in each of which a portion of the charge is confined while its temperature is progressively increased at least to that necessary for reduction as it advances into the furnace, regulating the rate of movement of the charge in each of said passages in proportion to the length thereof to effect substantial reduction of the ore before entering the furnace, maintaining a substantially non-oxidizing atmosphere in the furnace by the charge filling each passage and substantially excluding air and by substantially preventing draft in said furnace, and forming a bath of melted metal covered by liquid slag by the melting of the charge leaving each of said passages and the collection of the melted streams on the furnace hearth.

4. The process of treating a non-oxygenous ore which comprises forming a comminuted mixture of ore together with slag forming materials, continuously feeding said charge to a furnace maintained at a temperature above the melting point of the metal through a plurality of heated feed passages in each of which a portion of the charge is confined while blowing air in said passages to reduce the ore, regulating the speed of movement of the charge in each passage in proportion to the length thereof to effect substantial reduction of the charge before entering the furnace, and forming a bath of melted metal covered by liquid slag by melting of the charge leaving each of said passages and the collection of the melted streams on the furnace hearth.

5. Apparatus of the class described comprising a furnace having surrounding side walls of refractory material, means for heating said furnace and side walls, and means for continuously feeding a charge to said furnace in a plurality of small streams comprising a plurality of passages in said walls constituting ore reduction chambers and opening into said furnace along one side above the hearth thereof, a feed tube aligned with each passage and extending therefrom outwardly through the remainder of the side wall, variable speed feeding means operating in each feed tube for continuously feeding a charge through each tube and its associated passage into the furnace, and means for cooling each of said tubes.

6. Apparatus of the class described comprising a furnace having exterior walls and a refractory lining, means for heating said furnace, walls and lining, and means for continuously feeding a charge to said furnace in a plurality of small streams comprising a plurality of passages through said lining, feed tubes through said exterior walls one in alignment with each passage, feeding means for continuously feeding a charge through each tube and into its associated passage, thereby continuously forcing a stream of the charge through each passage and into the furnace, and means for cooling said feed tubes.

7. Apparatus of the class described comprising a furnace having exterior walls and a refractory lining, means for heating said furnace, walls and lining, and means for continuously feeding a charge to said furnace in a plurality of small streams comprising a plurality of passages through said lining, feed tubes through said exterior walls one in alignment with each passage, variable speed feeding means operating in each feed tube for continuously feeding a charge through each feed tube and its associated passage into the furnace, and means for cooling said tubes.

8. Apparatus of the class described comprising a furnace having exterior walls and a refractory lining, means for heating said furnace, walls and lining, and means for continuously feeding a charge to said furnace in a plurality of small streams comprising a plurality of passages through said lining, feed tubes through said exterior walls one in alignment with each passage, a variable speed screw in each tube for continuously feeding a charge through each feed tube and its associated passage into the furnace, and a cooling jacket surrounding each tube.

9. Apparatus of the class described comprising a furnace having walls of refractory material, means for heating said furnace and walls, and means for continuously feeding a charge to said furnace in a plurality of small streams comprising a plurality of passages extending through said side walls and opening into the furnace above the hearth thereof, the portion of each passage adjacent the furnace constituting a reduction chamber and the outer portion thereof a feed tube, a variable speed feeding means for each passage for continuously pushing a comminuted mass of the charge through each passage and into the furnace, the charge substantially filling each passage whereby air is substantially excluded from the passages, and means for cooling the feed tube portion of each passage.

10. Apparatus of the class described comprising a furnace having walls of refractory material, means for heating said furnace and walls, and means for continuously feeding a charge to said furnace in a plurality of small streams comprising a plurality of passages extending through said side walls and opening into the furnace above the hearth thereof, the portion of each passage adjacent the furnace constituting a reduction chamber and the outer portion thereof a feed tube, a variable speed screw in each feed tube portion for continuously pushing a comminuted mass of the charge through each passage and into the furnace, and means for cooling the feed tube portion of each passage.

11. Apparatus of the class described comprising a furnace having walls of refractory material, means for heating said furnace and walls, and means for continuously feeding a charge to said furnace in a plurality of small streams comprising a plurality of passages extending through said side walls and opening into the furnace above the hearth thereof, the portion of each passage adjacent the furnace constituting a reduction chamber and the outer portion thereof a feed tube, and a variable speed screw in each feed tube portion for continuously pushing a comminuted mass of the charge through each passage into the furnace, said screws having hollow shafts for blowing air into the passages.

JOHN W. FLANNERY.